(No Model.)
T. PEPPLER & D. V. CARHART.
CULTIVATOR.
No. 391,641. Patented Oct. 23, 1888.
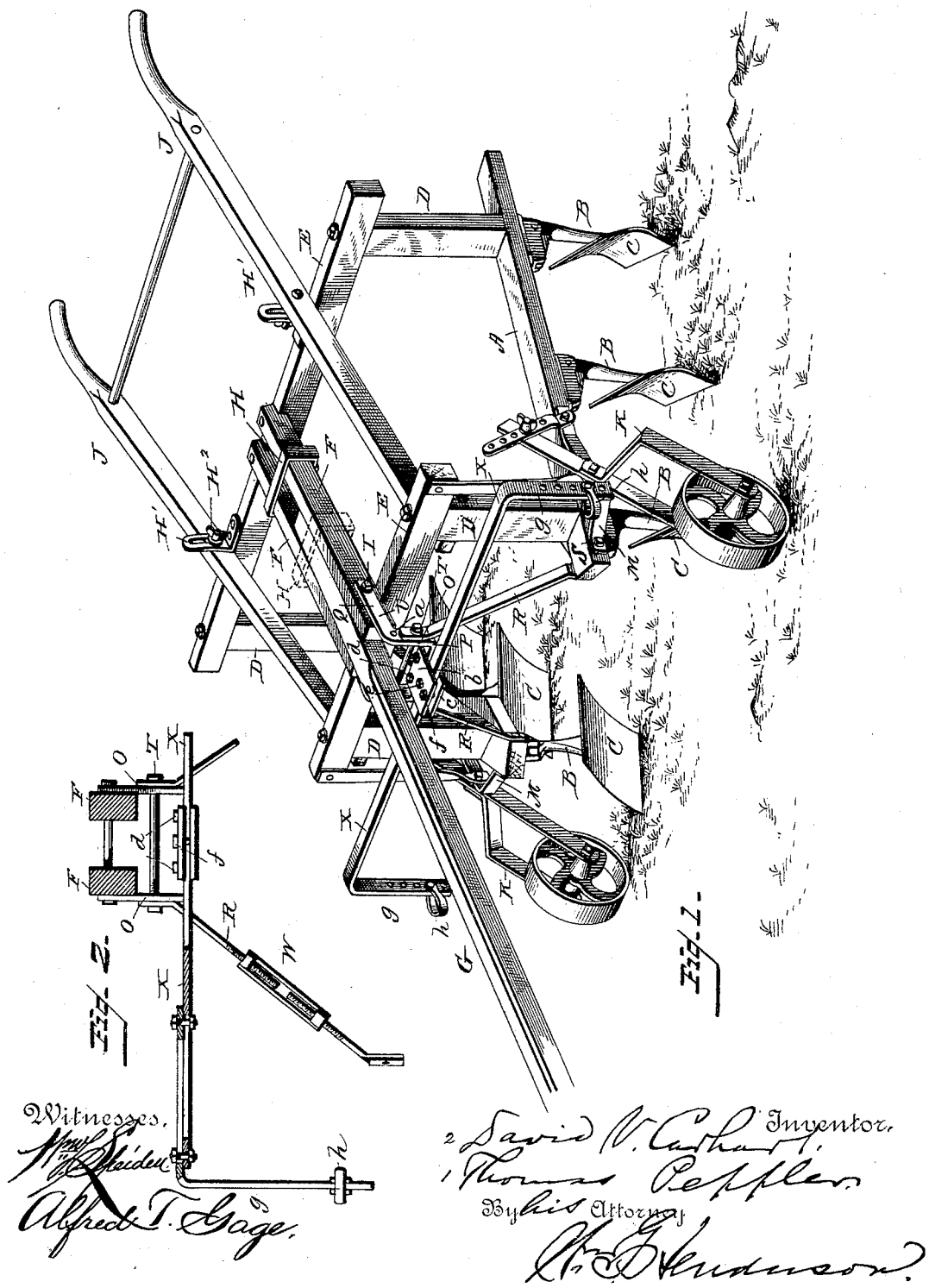

UNITED STATES PATENT OFFICE.

THOMAS PEPPLER AND DAVID V. CARHART, OF HIGHTSTOWN, NEW JERSEY.

CULTIVATOR.

SPECIFICATION forming part of Letters Patent No. 391,641, dated October 23, 1888.

Application filed October 8, 1887. Serial No. 251,842. (No model.)

*To all whom it may concern:*

Be it known that we, THOMAS PEPPLER and DAVID V. CARHART, citizens of the United States, residing at Hightstown, in the county of Mercer and State of New Jersey, have invented certain new and useful Improvements in Cultivators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in plows and cultivators, and is particularly well adapted to the "Riggs plow or cultivator," although it may be used on any other cultivator or plow to which it is applicable.

It has for its object to provide a "hitch" or swinging lever for the cultivator or plow, which will insure a loose tongue, if a tongue is used at all; that will remove all neck-draft; that will pull more directly from the sills and relieve the frame from strain; that will draw so as to avoid the downward tilting of the plow at its forward end, so common to the various forms of hitches heretofore used on this kind of cultivator; and that will give a free unobstructed passage for corn and other growing plants; and it has further for its object to provide an evener which, used in connection with the hitch or lever, gives more perfect control of the plow and causes each horse to draw his share of the weight or burden. To the accomplishment of the above and such other objects as may result from the construction, the invention consists in the construction and also in the combination of parts, hereinafter particularly described, and then sought to be specifically defined by the claims.

In the annexed drawings, Figure 1 is perspective of a Riggs plow or cultivator with the invention applied thereto. Fig. 2 is a detail view showing a manner of adjusting the parts.

The letter A designates the sills of the cultivator, set obliquely, as ordinarily, and having the standards B for the attachment of the points or the shovels C. From the sills rise the uprights or posts D, which are connected by the cross timbers or bars E, which two parts constitute the frame. The jaws F extend from one cross-beam to the other, and between the two jaws fits the tongue G, which is secured or pivoted thereto by a bolt, I, passed through the jaws and tongue. The tongue terminates short of the rear cross-timber, E, so as to be loose or free to turn on its pivotal bolt when the plow is being worked and thereby take strain from off the horse's shoulders. When the tongue is to be made rigid to transport from one field to another, the band H, which encircles the jaws, is slipped up from the position shown in full lines to that shown in dotted lines, so as to pass over the tongue and hold it rigid. The handles J are pivoted to the frame and secured at desired adjustment by slotted plates H' and nuts H². The wheel attachment, consisting of the adjustable levers K, having the wheels journaled therein and secured to the sills by brackets M, is applied and used as described in the patent of David V. Carhart, No. 351,357. The parts so far generally described and their functions, with the exception of the slide H, are more fully and at large set forth in said Patent No. 351,357.

In carrying out our present invention we suspend from some part of the cultivator, but preferably from the jaws F, a lever, U, preferably composed of upright bars O, connected together at their lower ends by a cross rod or bar, P, forming an arch-lever. The bars O may and preferably are formed with extensions Q, and are connected to the jaws by the bolt I in such manner that the arch-lever may be free to move or swing. This arch-lever is connected to the forward ends of the sills by means of bars or rods R, which are secured at their lower ends to the inside of the sills preferably by the same bolts, S, which connect the wheel-brackets thereto, and so that the bars or rods can turn on the bolts. The other ends of the rods are jointed or attached to the bars O of the arch-lever by bolt T, fitting in one set of a series of holes, *a*, formed in the upright bars. Now, when the draft is applied to the lever U, the lower end of the lever will have a tendency to swing forward, and the draw or pull will be forward and somewhat upward and direct from the sills, so that any tendency to tilt at the forward end is overcome and the strain is thrown direct upon the sills instead of upon the frame. The draft may be applied to the arch-lever in any suitable way and either directly or indirectly through an evener of the following general construction: To the lower ends of the arch-lever—say to the cross-bar P—we apply or form a socket in which we swivel the evener. The socket may be formed of two plates, $b$ and $c$, fastened to the upper and lower sides of the cross-bar by bolts $d$, and in the socket is swiveled by a bolt, $e$, the evener X, and another bolt, $f$, may be passed through the plates in front of the evener to prevent the plates from spreading. The evener X has bent and downwardly-extending ends $g$, to which are connected the clevises $h$ for hitching the horses. The clevises are adjustable up and down by shifting from one hole to another, so as to regulate the draft according to the kind of plowing or cultivating being done. The lower the attachment of the clevis or application of the draft the greater the uplift and shallower the cut, and the higher the application of the draft the deeper the cut.

The arched or swinging lever can be used without the evener and the advantages of the lever be obtained; but the most satisfactory results, on the whole, are obtained by using the lever and evener together.

It is also obvious that the arched or swinging lever can be made without the extension Q and even without the connecting-bar P, and that by providing its upright arms with a series of holes or perforations it can be adjusted high or low, so as to lessen or increase the leverage.

It will thus be seen that we do not confine ourselves to the form of the swinging lever, as the same may be varied and yet the advantages of the lever obtained. The evener, too, instead of being in one continuous piece, may be made in slotted parts, one part being connected to the other by bolts, as shown in Fig. 2, or otherwise, so as to render it adjustable lengthwise to increase or lessen its width to suit the width of row being plowed.

We prefer to make each coupling-rod R in two parts, having screw-threads formed on the adjoining ends and a turn-buckle, W, applied thereto to draw the parts together or force them apart, so as to shorten or lengthen them, as shown in Fig. 2.

By combining the hitch or swinging lever with the loose tongue the draft is made light on the horse, and galling of his shoulders is prevented, as the tongue swings to take the strain from off the shoulders, and the draft or lift is made to be upward, so as to overcome the tendency, which is specially strong in the Riggs cultivator, to tilt downward at the front.

The objects and advantages hereinbefore enumerated are obtained in a very high degree and satisfactory manner by simple and efficient means and at a comparatively small cost.

The hitch can be applied to the cultivators or any of the Riggs plows quickly and easily and without any change in the construction to permit the same.

The improvement is shown applied to a Riggs plow in connection with a wheel attachment; but that is only for purposes of illustration. The hitch or swinging lever can be applied to any form of wheel or other cultivator or plow to which it is applicable, and either with or without a tongue, and being high and extending upward, as shown, will not interfere with high corn or other plants when the plow is used for cultivating the same.

By "frame I" we do not mean to restrict ourselves to the kind of frame herein illustrated and described, but include any form of frame carrying the parts which work up the ground and adapted to have the lever and rods applied thereto to operate substantially as they have been herein described.

Having described our invention and set forth its merits, what we claim is—

1. The combination, with the sills of the cultivator and its upper part or frame, of the adjusting hitch-lever suspended from the upper part of the cultivator, and the rods connecting said lever to the sills, whereby the leverage may be increased or decreased, substantially as described.

2. The hitch-lever suspended from the upper part of the cultivator and composed of the upright bars connected together at their lower ends by a cross bar or rod, in combination with the rods extending downward from said lever and connecting the same with the lower part of the cultivator, substantially as described.

3. The combination, with the loose tongue and frame, of the hitch-lever suspended from the upper part of the frame and the rods connecting the lever to the lower part of the frame, substantially as and for the purpose set forth.

4. The combination, with the upper part of the frame and the sills, of the hitch-lever suspended from the upper part of the frame and the sectional adjusting-rods connecting it to the lower part of the frame, substantially as described.

5. The combination, with the frame, of the suspended lever U, rods R, connecting the lever to the lower part of the frame, and the evener X, applied substantially as shown, for the purposes set forth.

In testimony whereof we affix our signatures in presence of two witnesses.

THOMAS PEPPLER.
DAVID V. CARHART.

Witnesses:
R. M. J. SMITH,
FRANK D. THOMSON.